United States Patent
Schrum, Jr.

(10) Patent No.: US 9,294,309 B2
(45) Date of Patent: Mar. 22, 2016

(54) FORWARDING TABLES FOR HYBRID COMMUNICATION NETWORKS

(71) Applicant: QUALCOMM Incorporated, San Diego, CA (US)

(72) Inventor: Sidney Brower Schrum, Jr., Ocala, FL (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/713,872

(22) Filed: May 15, 2015

(65) Prior Publication Data
US 2015/0249551 A1    Sep. 3, 2015

Related U.S. Application Data

(62) Division of application No. 13/558,006, filed on Jul. 25, 2012, now Pat. No. 9,065,677.

(51) Int. Cl.
*H04L 12/28* (2006.01)
*H04L 12/64* (2006.01)
(Continued)

(52) U.S. Cl.
CPC ............ *H04L 12/6418* (2013.01); *H04L 1/203* (2013.01); *H04L 12/4625* (2013.01);
(Continued)

(58) Field of Classification Search
USPC ......................................... 709/238, 239, 245
See application file for complete search history.

(56) References Cited

U.S. PATENT DOCUMENTS 5,309,437 A * 5/1994 Perlman ............... H04L 12/4625
370/401
6,147,993 A * 11/2000 Kloth ..................... H04L 49/602
370/392
(Continued)

FOREIGN PATENT DOCUMENTS

CN          101350760      1/2009
EP           2226975       9/2010
(Continued)

OTHER PUBLICATIONS

"Nortel Networks: "NetKnowledge: Routing—Course 2891AEN"", XP055095268; URL:http:??k-12:pisd.edu/currinst/network/S_Routing/Rt_Guide%20%28254%20pages%29.pdf [retrieved on Jan. 8, 2014], Jul. 1, 2002, 256 pages.
(Continued)

*Primary Examiner* — Duc C Ho
(74) *Attorney, Agent, or Firm* — DeLizio Law, PLLC

(57) ABSTRACT

A hybrid device can apply forwarding tables associated with one or more other hybrid network devices of a hybrid communication network to control the entire transmission route of a frame scheduled for transmission. The hybrid device can use its forwarding table and a forwarding table of a destination hybrid device to determine a source network interface address, a destination network interface address, and a frame transmission route. The destination hybrid device can use forwarding tables associated with one or more hybrid network devices to determine whether to process or drop a received frame, whether the frame was previously received, and/or whether the frame was received on an incorrect network interface. The hybrid device can also use the forwarding tables to ensure that the frame comprises an appropriate link layer address and to select an appropriate transmission route based on analyzing link performance values associated with multiple transmission routes.

17 Claims, 7 Drawing Sheets

(51) Int. Cl.
*H04L 12/721* (2013.01)
*H04L 12/751* (2013.01)
*H04L 12/46* (2006.01)
*H04L 1/20* (2006.01)
*H04L 12/741* (2013.01)
*H04W 40/24* (2009.01)
*H04W 84/12* (2009.01)

(52) U.S. Cl.
CPC ............... *H04L45/02* (2013.01); *H04L 45/54* (2013.01); *H04L 45/66* (2013.01); *H04W 40/248* (2013.01); *H04L 2012/6448* (2013.01); *H04W 84/12* (2013.01)

(56) References Cited

U.S. PATENT DOCUMENTS

| | | | |
|---|---|---|---|
| 6,792,471 B2 * | 9/2004 | Nomura | H04L 12/5601 370/392 |
| 7,486,622 B2 | 2/2009 | Regan et al. | |
| 2002/0118682 A1 | 8/2002 | Choe | |
| 2003/0106067 A1 * | 6/2003 | Hoskins | H04L 12/2801 725/119 |
| 2003/0120800 A1 * | 6/2003 | Novetzke | H04L 29/06 709/236 |
| 2006/0153193 A1 | 7/2006 | Kim et al. | |
| 2008/0159288 A1 | 7/2008 | Nagarajan | |
| 2009/0135833 A1 | 5/2009 | Lee et al. | |
| 2009/0245243 A1 | 10/2009 | Rangarajan et al. | |
| 2010/0284407 A1 | 11/2010 | Leelanivas et al. | |
| 2011/0141899 A1 | 6/2011 | Yae | |
| 2011/0271009 A1 * | 11/2011 | Doshi | H04L 45/00 709/242 |
| 2011/0286342 A1 | 11/2011 | Ee et al. | |
| 2012/0147890 A1 | 6/2012 | Kikuchi | |
| 2013/0107884 A1 | 5/2013 | Ee et al. | |
| 2013/0132604 A1 * | 5/2013 | Cohen | H04W 76/025 709/231 |
| 2014/0029447 A1 | 1/2014 | Schrum, Jr. | |

FOREIGN PATENT DOCUMENTS

| | | |
|---|---|---|
| WO | 2011012081 | 2/2011 |
| WO | 2012122366 | 9/2012 |
| WO | 2014018733 | 1/2014 |

OTHER PUBLICATIONS

"PCT Application No. PCT/US2013/052015 International Preliminary Report on Patentability", Nov. 25, 2014, 15 pages.
"PCT Application No. PCT/US2013/052015 International Search Report", Jan. 16, 2014, 20 pages.
"PCT Application No. PCT/US2013/052015 Written Opinion", Sep. 16, 2014, 8 pages.
"PCT Application No. PCT/US2013/052015, Invitation to Pay Additional Fees and Partial Search Report", Nov. 14, 2013, 7 pages.
"U.S. Appl. No. 13/558,006 Final Office Action", Jan. 30, 2014, 8 pages.
"U.S. Appl. No. 13/558,006 Final Office Action", Jan. 16, 2015, 9 pages.
"U.S. Appl. No. 13/558,006 Office Action", Jun. 23, 2014, 7 Pages.
"U.S. Appl. No. 13/558,006 Office Action", Sep. 10, 2014, 8 pages.
Tai, et al., "LAN Interconnection: A Transparent, Shortest-Path Approach", Communications—Rising to the Heights. Denver, Jun. 23-26, 1991. [Proceedings of the International Conference on Communications], New York, IEEE, US, vol. , Jun. 23, 1991, pp. 1666-1670.
Co-Pending U.S. Appl. No. 13/558,006, filed Jul. 25, 2012, 64 pages.

* cited by examiner

FORWARDING TABLES FOR HYBRID COMMUNICATION NETWORKS

RELATED APPLICATIONS

This application is a Divisional of and claims the Priority Benefit of U.S. application Ser. No. 13/558,006 filed on Jul. 25, 2012.

BACKGROUND

Embodiments of the inventive subject matter generally relate to the field of communication networks and, more particularly, to forwarding tables for hybrid communication networks.

Hybrid communication networks typically comprise multiple network devices that implement multiple networking technologies (e.g., wireless local area network (WLAN) technologies, powerline communication technologies, Ethernet, etc.). Typically, the communication mechanisms and protocol specifics (e.g., device and topology discovery, bridging to other networks, etc.) are unique to each networking technology. The multiple networking technologies are typically interconnected using bridging-capable devices that forward frames between the different network technologies and media to form a single, extended communication network. Hybrid communication networks typically present multiple frame delivery routes between any two hybrid devices.

SUMMARY

Various embodiments for employing forwarding tables in hybrid communication networks are disclosed. In one embodiment, it is determined, at a first hybrid device of a communication network, that a message is scheduled to be transmitted to a second hybrid device of the communication network. A first of a plurality of network interface addresses associated with the first hybrid device, a first of a plurality of network interface addresses associated with the second hybrid device, and a transmission route via which to transmit the message to the second hybrid device is determined based, at least in part, on a forwarding table associated with the first hybrid device and a forwarding table associated with the second hybrid device. The message is generated with the first of the plurality of network interface addresses of the first hybrid device and the first of the plurality of network interface addresses of the second hybrid device based, at least in part, on the forwarding table associated with the first hybrid device and the forwarding table associated with the second hybrid device. The message comprising the first of the plurality of network interface addresses associated with the first hybrid device and the first of the plurality of network interface addresses associated with the second hybrid device is transmitted to the second hybrid device via the transmission route.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
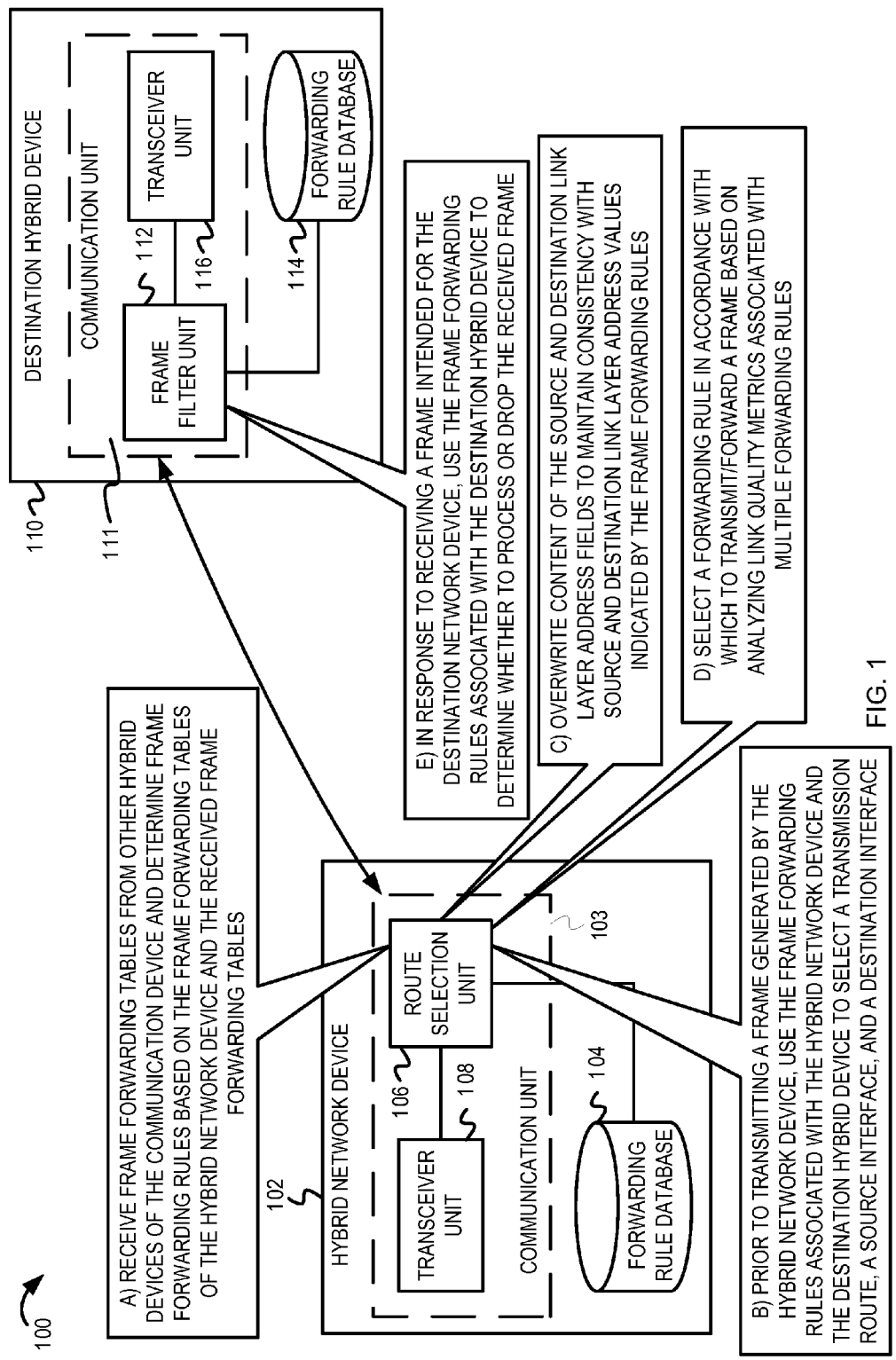
FIG. 1 is a block diagram illustrating a hybrid communication network including implementation of forwarding tables in the hybrid communication network.

The description that follows includes exemplary systems, methods, techniques, instruction sequences, and computer program products that embody techniques of the present inventive subject matter. However, it is understood that the described embodiments may be practiced without these specific details. For instance, although in some embodiments the forwarding mechanisms can be implemented for hybrid communication networks comprising wireless local area network (WLAN) devices (e.g., IEEE 802.11n devices), powerline network devices (e.g., HomePlug AV) and Ethernet devices, in other embodiments the forwarding mechanisms can be implemented for hybrid communication networks that may comprise other suitable types of network devices that implement other standards/protocols (e.g., Multimedia over Coax Alliance (MoCA), WiMAX, etc.). In other instances, well-known instruction instances, protocols, structures, and techniques have not been shown in detail in order not to obfuscate the description.

Hybrid network devices that support forwarding typically implement frame forwarding tables that control the frame forwarding behavior of the hybrid network device. However, hybrid network devices that are not designated as forwarding devices (e.g., that do not implement frame forwarding, that are not configured to forward frames, etc.) may not implement forwarding tables. In this regard, the use of conventional frame forwarding tables in hybrid network devices is limited. For example, a conventional hybrid device that sources a frame may not use forwarding tables (associated with one or more other hybrid devices of the hybrid communication network) to determine a transmission route (and corresponding source interface and destination interface). Accordingly, the conventional hybrid device may not have knowledge (or control) of the entire transmission route and may not select an overall optimum transmission route. As another example, the conventional hybrid device may not apply frame forwarding tables to determine whether to provide a received frame to the upper protocol layers for subsequent processing or whether to drop the received frame. This can cause duplicate frames to be provided to the upper protocol layers, resulting in frame processing errors. As another example, a forwarding hybrid device may not be configured to change the source and destination link layer addresses in a frame once the source hybrid device populates these fields. This can result in confusion/conflicts if the transmission route is changed mid-route and/or if a legacy learning bridge receives the frame. Furthermore, conventional frame forwarding tables are normally semi-static and do not allow for rapid, dynamic, local routing decisions. This can hinder prompt reaction to varying channel conditions and/or implementing dynamic load balancing.

In some embodiments, a hybrid network device can be configured to apply the frame forwarding tables to frames sourced by the hybrid device—irrespective of whether the hybrid network device is designated as a forwarding hybrid device or a non-forwarding hybrid device, as described below in FIG. 2. Employing forwarding tables (associated with one or more other hybrid network devices of the hybrid communication network) prior to transmitting frames generated by a source hybrid device can allow the source hybrid device to control the entire transmission route. In some embodiments, a destination hybrid device can be configured to apply the frame forwarding tables to frames intended for the destination hybrid device. The destination hybrid device can determine, based on the frame forwarding tables, whether to process the received frame or whether to drop the frame, as described below in FIG. 3. Applying forwarding tables (associated with one or more devices of the hybrid communication network) to frames received at (and intended for) the destination hybrid device can help filter out duplicate frames and determine if the frame was received on an incorrect network interface. In some embodiments, the hybrid network device can employ information in the frame forwarding tables to overwrite (if needed) one or more link layer address fields prior to forwarding a received frame. Overwriting one or more fields of a frame prior to forwarding the frame can help maintain consistency between the link layer address indicated in the frame and the corresponding network interface when making local routing changes and can also help minimize confusion/conflicts at legacy learning bridges. In some embodiments, the hybrid network device can also use the frame forwarding tables to identify alternate transmission routes (and/or transmit interface(s)) and to select an appropriate transmission route based on analyzing link performance values associated with the transmission routes. Using forwarding tables in hybrid communication networks can also enable the hybrid network devices to make rapid route changes (and to identify a secondary transmission route) if the link quality of a primary transmission route degrades. Using the forwarding tables can enable dynamic load balancing and can enable frames associated with a stream to be delivered with low latency even if the link quality of the primary transmission route degrades.

FIG. 1 is a block diagram illustrating a hybrid communication network 100 including a mechanism for implementing forwarding tables in the hybrid communication network 100. The hybrid communication network 100 comprises a hybrid network device 102 and a destination hybrid device 110. The hybrid network device 102 comprises a communication unit 103 and a forwarding rule database 104. The communication unit 103 comprises a route selection unit 106 and a transceiver unit 108. The destination hybrid device 110 comprises a communication unit 111 and a forwarding rule database 114. The communication unit 111 comprises a frame filter unit 112 and a transceiver unit 116. The hybrid network device 102 can be a source hybrid device that generates a frame for transmission or an intermediate forwarding hybrid device. Although not depicted in FIG. 1, the hybrid network device 102 can comprise a frame filter unit; while the destination hybrid device 110 can comprise a route selection unit. Although not depicted in FIG. 1, the hybrid network device 102 and the destination hybrid device 110 can each comprise one or more additional processing units (e.g., for generating the frame, processing received frames, etc.).

In one example, the hybrid network devices 102 and 110 can each comprise a powerline interface, an Ethernet interface, and a WLAN interface that enable the hybrid devices to connect to a powerline communication network, Ethernet, and a WLAN, respectively. In some implementations, the hybrid network devices 102 and 110 can each be an electronic device such as a laptop computer, a tablet computer, a mobile phone, a smart appliance, a gaming console, an access point, or other suitable electronic devices with suitable communication capabilities (e.g., WLAN communication capabilities, powerline communication capabilities, Ethernet communication capabilities, etc.). The communication units 103 and 111 can be implemented on a system on a chip (SoC), an application-specific integrated circuit (ASIC), or other suitable type of integrated circuit (IC). Furthermore, in some embodiments, the communication units 103 and 111 can be implemented as one or more integrated circuits on a circuit board (e.g., including a network interface card, at least one processor, and/or other processing units). In some embodiments, in addition to powerline communication protocols, WLAN communication protocols, and Ethernet communication protocols, the communication units 103 and 111 of the hybrid network devices 102 and 110 respectively can implement other protocols and functionality to enable other types of communications (e.g., Bluetooth®, WiMAX, etc.).

In some implementations, the networking functionality of the hybrid network device 102 (and also the destination hybrid device 110) can be partitioned into sub-functions using a "layered" approach, consistent with the International Standards Organization (ISO) Open Systems Interconnection (OSI) reference model. The set of networking protocol layers may be referred to as a "protocol stack." The protocol stack is typically divided into "upper protocol layers" and "lower protocol layers." The lower protocol layers include the physical (PHY) layer and the Medium Access Control (MAC) layer. Typically, the number of PHY layers and corresponding MAC layers is determined based on the number of network interfaces associated with the hybrid network device 102. In other words, if the hybrid network device 102 comprises three network interfaces, the protocol stack of the hybrid network device 102 typically comprises three PHY layers and corresponding three MAC layers. Each of the PHY layers and the corresponding MAC layer couples the hybrid network device 102 to one (possibly distinct) communication network. The upper protocol layers can include a network layer (e.g., implementing an Internet Protocol version 4 (IPv4) communication protocol, an Internet Protocol version 6 (IPv6) communication protocol, an AppleTalk® communication protocol, or other suitable network layer protocol), a transport layer (e.g., transmission control protocol (TCP), user datagram protocol (UDP), or other suitable transport layer protocol depending on the network layer protocol), and one or more applications.

The protocol stack of the hybrid network device 102 can also comprise a "hybrid adaptation layer" between the network layer and the MAC layers. In some implementations, the hybrid adaptation layer can comprise the route selection unit 106 to execute functionality described below in FIGS. 1-2 and 4-6. In some implementations, the hybrid adaptation layer can comprise the frame filter unit 112 to execute functionality described below in FIG. 3. The hybrid adaptation layer can implement functionality for managing communications in the hybrid network device 102 with a single set of upper protocol layers (e.g., a single network layer and a single transport layer) but with multiple network interfaces (e.g., multiple PHY layers and multiple MAC layers). The hybrid adaptation layer can also enable the upper protocol layers to operate as if the hybrid network device 102 comprises only a single MAC layer and a corresponding single PHY layer. It is noted that the protocol stack can comprise other suitable layers or sub-layers, depending on the networking technology and optional protocols that might be implemented. Furthermore, in some embodiments, one or more other sublayers (singly or in combination with the hybrid adaptation layer) may execute functionality described herein in FIGS. 1-6.

With reference to FIG. 1, at stage A, the hybrid network device 102 (e.g., the hybrid adaptation layer of the hybrid network device 102) receives frame forwarding tables from one or more other hybrid devices (e.g., the destination hybrid device 110) in the hybrid communication network 100. The route selection unit 106 (or another forwarding table analysis unit) can analyze the forwarding table of the hybrid network device 102 and the forwarding tables received from the other hybrid devices and can determine one or more frame forwarding rules. In some embodiments, frame forwarding rules can be entries in the frame forwarding tables. Each frame forwarding rule (e.g., stored in the forwarding rule database 104 and/or the forwarding rule database 114) can comprise a frame classification specification and a frame forwarding specification. The frame classification specification can indicate one or more fields (and/or other frame characteristics) that should be matched against corresponding fields (and/or characteristics) in received frames. The frame classification specification can indicate one or more fields (and/or other frame characteristics) that should be ignored when determining if the frame forwarding rule should be applied to the received frame. For example, the frame classification specification can comprise a destination link layer address and an indicator (e.g., a flag bit) that indicates if the destination link layer address field is to be matched. As another example, the frame classification specification can also include the frame's source link layer address, frame priority, Ethertype/protocol identifier, network layer addresses, quality of service (QoS) indicators, and other such frame characteristics. If the values of one or more fields (or characteristics) of the received frame match the values specified in the frame forwarding rule, then the frame forwarding rule can be used for transmitting/forwarding/processing the frame. The frame forwarding specification can include a list of one or more network interfaces implemented by the hybrid device and can indicate which network interface should be used for transmitting the frame. As will be further described below, the hybrid network device (whether a source hybrid device, a destination hybrid device, or a forwarding hybrid device) can apply the forwarding rules to determine a transmission route, a transmit interface, a receive interface, appropriate link layer addresses, and/or how to process the frames.

As depicted in stage B, in some embodiments, the hybrid network device 102 can apply forwarding rules to the frames prior to transmitting the frames (sourced by the hybrid network device 102) to the destination hybrid device 110. For example, the route selection unit 106 of the hybrid network device 102 can apply the forwarding rules to frames (e.g., frames that are passed from upper protocol layers to the hybrid adaptation layer for transmission). Accordingly, the source interface and transmission route associated with a source hybrid device (e.g., the hybrid network device 102) can be selected based on other hybrid devices' forwarding tables. In some embodiments, as described above, hybrid devices in the hybrid communication network 100 can broadcast their respective forwarding tables to other hybrid devices in the hybrid communication network 100. The source hybrid network device 102 can select the best transmission route (and the corresponding source interface) based on knowledge of its forwarding table and forwarding tables associated with other hybrid devices (e.g., the destination hybrid device 110) in the hybrid communication network 100. The transceiver unit 108 can then transmit the frame to the destination hybrid device 110 from the identified source interface and via the identified transmission route. Operations of the source hybrid network device 102 applying forwarding tables associated with the source hybrid network device 102 and other hybrid devices (e.g., the destination hybrid device 110) to determine the transmission route and the source interface are further described below in FIG. 2.

As depicted in stage C, in some embodiments, the hybrid network device 102 can be configured to overwrite the destination link layer address and/or the source link layer address prior to forwarding frames, when the hybrid network device 102 is an intermediate forwarding device. As will be further described in FIG. 4, the route selection unit 106 of the hybrid network device 102 can use forwarding rules (determined based on its forwarding table and forwarding tables associated with other hybrid devices in the communication network) to determine the expected source and/or destination link layer addresses. The route selection unit 106 can overwrite (if needed) the source and/or destination link layer addresses in a frame scheduled to be forwarded to maintain consistency with corresponding expected values (and to avoid conflicting learning at legacy learning bridges).

As depicted in stage D, in some embodiments, the forwarding rule database 104 can include secondary/alternate forwarding rules that indicate secondary transmit interfaces and corresponding secondary transmission routes. As will be further described in FIGS. 5-6, the hybrid adaptation layer (e.g., the route selection unit 106) can use link performance values (e.g., medium utilization, packet error rate, link delivery latency, etc.) for selecting a secondary forwarding rule if the primary forwarding rule does not meet predetermined link performance thresholds. Furthermore, the hybrid adaptation layer can compare link performance values (associated with the secondary forwarding rules) against corresponding link performance thresholds to determine which (if any) secondary forwarding rule (that specifies a secondary route and/or a secondary transmit network interface) should be used for transmitting the frame.

In some embodiments, secondary forwarding rules can also enable the forwarding hybrid device to switch transmission routes if the quality of the original transmission route degrades. For example, suppose that a source hybrid device comprises a PLC interface and a WLAN interface that can be used to transmit frames from the source hybrid device to the destination hybrid device. The primary forwarding rule may identify a primary transmission route using the WLAN interface and accordingly, the source hybrid device may transmit the frame to the destination device via the WLAN interface and the WLAN communication medium. If the WLAN communication medium degrades (e.g., if the medium utilization of the WLAN communication medium exceeds a threshold medium utilization), a hybrid forwarding device 102 can detect this degradation. Accordingly, when the hybrid forwarding device 102 receives the frame, the hybrid forwarding device 102 can determine that a secondary forwarding rule (that identifies a PLC transmission route and a PLC transmit interface) has a better performance as compared to the primary forwarding route (that identifies the WLAN transmission route and the WLAN transmit interface). The hybrid forwarding device 102 can forward the frame via the PLC transmission route.

In some embodiments, as depicted in stage E, the frame filter unit 112 (e.g., implemented as part of the hybrid adaptation layer at the destination hybrid device 110) can apply the forwarding rules to frames intended for the destination hybrid device 110. Instead of providing all the frames intended for the destination hybrid device 110 to the upper protocol layers of the destination hybrid device 110, the frame filter unit 112 can filter the received frames and determine whether to pass the received frames to the upper protocol layers based on knowledge of its forwarding table (and in some instances, forwarding tables associated with other hybrid devices in the communication network). If the frame filter unit 112 determines not to forward the received frames to the upper protocol layers based on the frame forwarding rules, the frame filter unit 112 can drop/discard the received frames. Operations of the destination hybrid device 110 using its forwarding tables to determine whether to forward received frames to the upper protocol layers or whether to drop the received frames are further described below in FIG. 3.

It is noted that the stages A-E depicted in FIG. 1 may not be sequential and in some embodiments, only a subset of the stages depicted in FIG. 1 may be executed. In one example, after the hybrid device determines the frame forwarding rules at stage A, the source hybrid device may only execute stages B and D to identify the transmission route.

Figure 2:
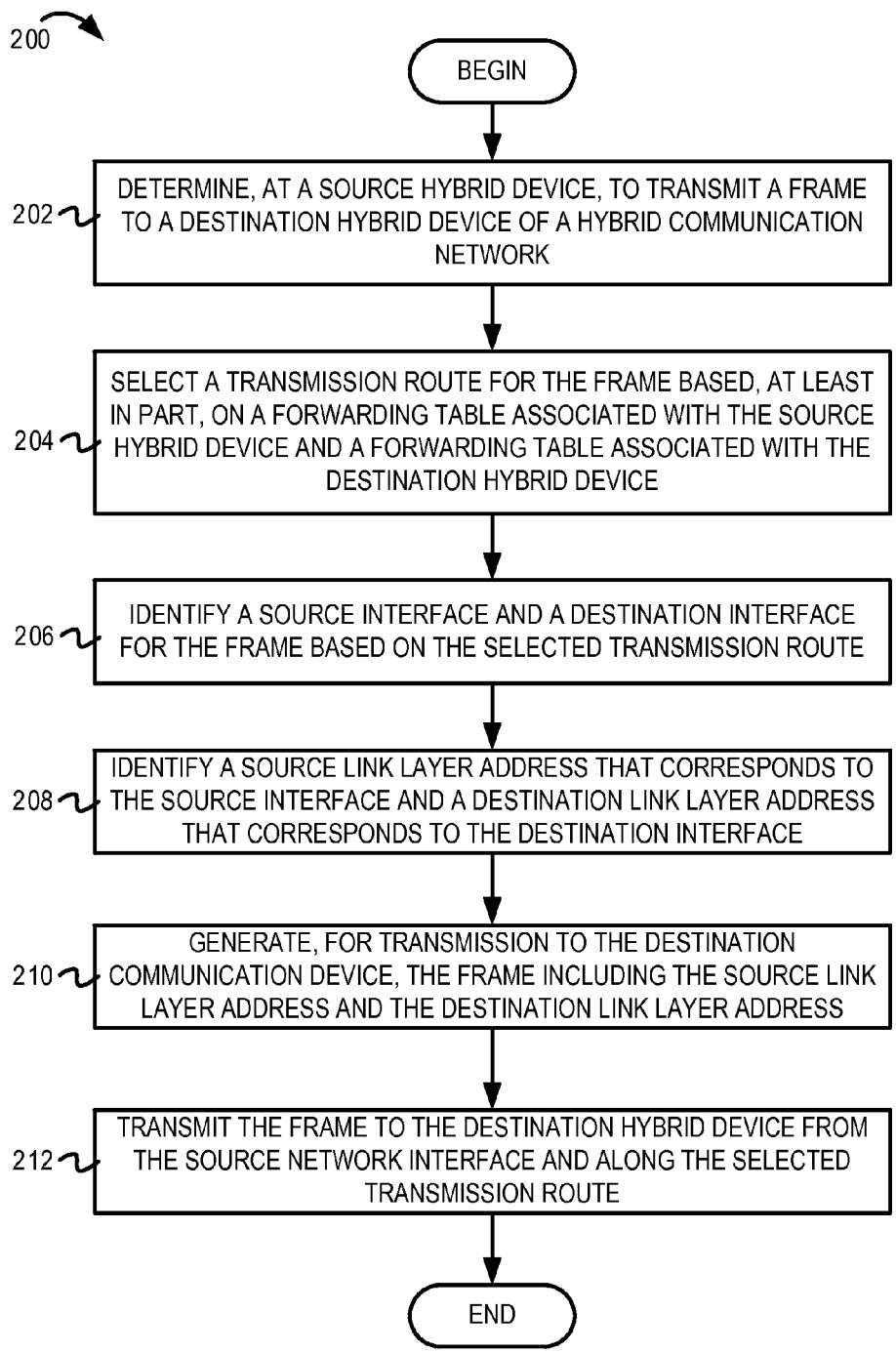
FIG. 2 is a flow diagram illustrating example operations of a source hybrid device using forwarding tables prior to transmitting a frame to a destination hybrid device.

FIG. 2 is a flow diagram ("flow") 200 illustrating example operations of a source hybrid device using forwarding tables prior to transmitting a frame to a destination hybrid device. The flow 200 begins at block 202.

At block 202, a source hybrid device determines to transmit a frame to a destination hybrid device of a hybrid communication network. With reference to the example of FIG. 1, the route selection unit 106 of the source hybrid device 102 can receive an indication that a frame is scheduled to be transmitted to the destination hybrid device 110. As discussed above with reference to FIG. 1, the route selection unit 106 may be implemented as part of a hybrid adaptation layer of the source hybrid device 102. Thus, an upper protocol layer of the source hybrid device 102 may generate the frame and may provide the frame (for transmission) to the hybrid adaptation layer. As will be further described below in FIG. 2, the route selection unit 106 can apply frame forwarding rules (generated from frame forwarding tables associated with the source hybrid device 102, frame forwarding tables associated with the destination hybrid device 110, and/or frame forwarding tables associated with other hybrid network devices of the hybrid communication network 100) to the frame to identify a transmission route, a source interface (also referred to as a transmit interface), and a destination interface (also referred to as a receive interface) for the frame that is scheduled to be transmitted. The flow continues at block 204.

At block 204, a transmission route is selected for the frame based, at least in part, on the forwarding table associated with the source hybrid device and the forwarding table associated with the destination hybrid device. For example, the route selection unit 106 can access the forwarding rule database 104 and can identify one or more forwarding rules that should be applied to the frame. In some embodiments, the forwarding tables (associated with the source hybrid device 102 or received from other hybrid devices) can comprise forwarding rules that may be applied depending on the source hybrid device 102, the destination hybrid device 110, and other suitable factors. In other embodiments, the source hybrid device 102 can compile information received in multiple forwarding tables and can generate a set of forwarding rules that should be applied to the frame. Each of the forwarding rules can comprise a field that indicates a source hybrid device identifier (e.g., a network interface identifier) associated with the forwarding rule. This can enable the route selection unit 106 to select and apply specific forwarding rules to be frames sourced from the source hybrid device 102. The flow continues at block 206.

At block 206, a source interface and a destination interface is identified for the frame based on the selected transmission route. For example, the route selection unit 106 can identify one of a plurality of network interfaces associated with the source hybrid device as the "source interface" from which the source hybrid device 102 should transmit the frame. The route selection unit 106 can select the source interface based, at least in part, on the selected transmission route and the forwarding tables associated with the source hybrid device 102 and the destination hybrid device 110. The route selection unit 106 can also identify one of a plurality of network interfaces associated with the destination hybrid device 110 as the "destination interface" at which the destination hybrid device 110 will receive the frame. The route selection unit 106 can select the destination interface based, at least in part, on the selected transmission route and the forwarding tables associated with the source hybrid device 102 and the destination hybrid device 110. The flow continues at block 208.

At block 208, a source link layer address that corresponds to the source interface and a destination link layer address that corresponds to the destination interface are identified. The route selection unit 106 can select a link layer address (e.g., a medium access control (MAC) address) associated with the destination interface (selected at block 206) as the destination link layer address. The route selection unit 106 can select a link layer address (e.g., a MAC address) associated with the source interface (selected at block 206) as the source link layer address. It should be noted that in some embodiments, the route selection unit 106 can select a link layer address associated with the hybrid adaptation layer as the source link layer address. In another embodiment, the route selection unit 106 can select a link layer address associated with any of the plurality of network interfaces of the source hybrid device (not necessarily the selected source interface) as the source link layer address. The flow continues at block 210.

At block 210, the frame including the source link layer address and the destination link layer address is generated for transmission to the destination hybrid device. For example, a packet generation unit (not shown) of the source hybrid device 102 can populate the source link layer address and the destination link layer address in a source link layer address field and a destination link layer address field of the frame. The flow continues at block 212.

At block 212, the frame is transmitted from the source network interface to the destination hybrid device via the selected transmission route. From block 212, the flow ends.

It should be understood that by executing the operations of FIG. 2 prior to transmitting frames (generated by the source hybrid device 102), the source hybrid device 102 can ensure that it has control over the entire transmission route selected for transmitting the frame. The forwarding tables received from one or more other hybrid devices (e.g., the destination hybrid device 110) of the hybrid communication network 100 can help ensure that the source hybrid device 102 is aware of the transmission routes that will be used by the other hybrid devices, link quality information associated with the transmission routes that will be used by the other devices, etc. The source hybrid device 102 can then select the transmission route and its source interface to avoid congested communication links, congested communication networks, and congested intermediate forwarding devices (if any).

Figure 3:
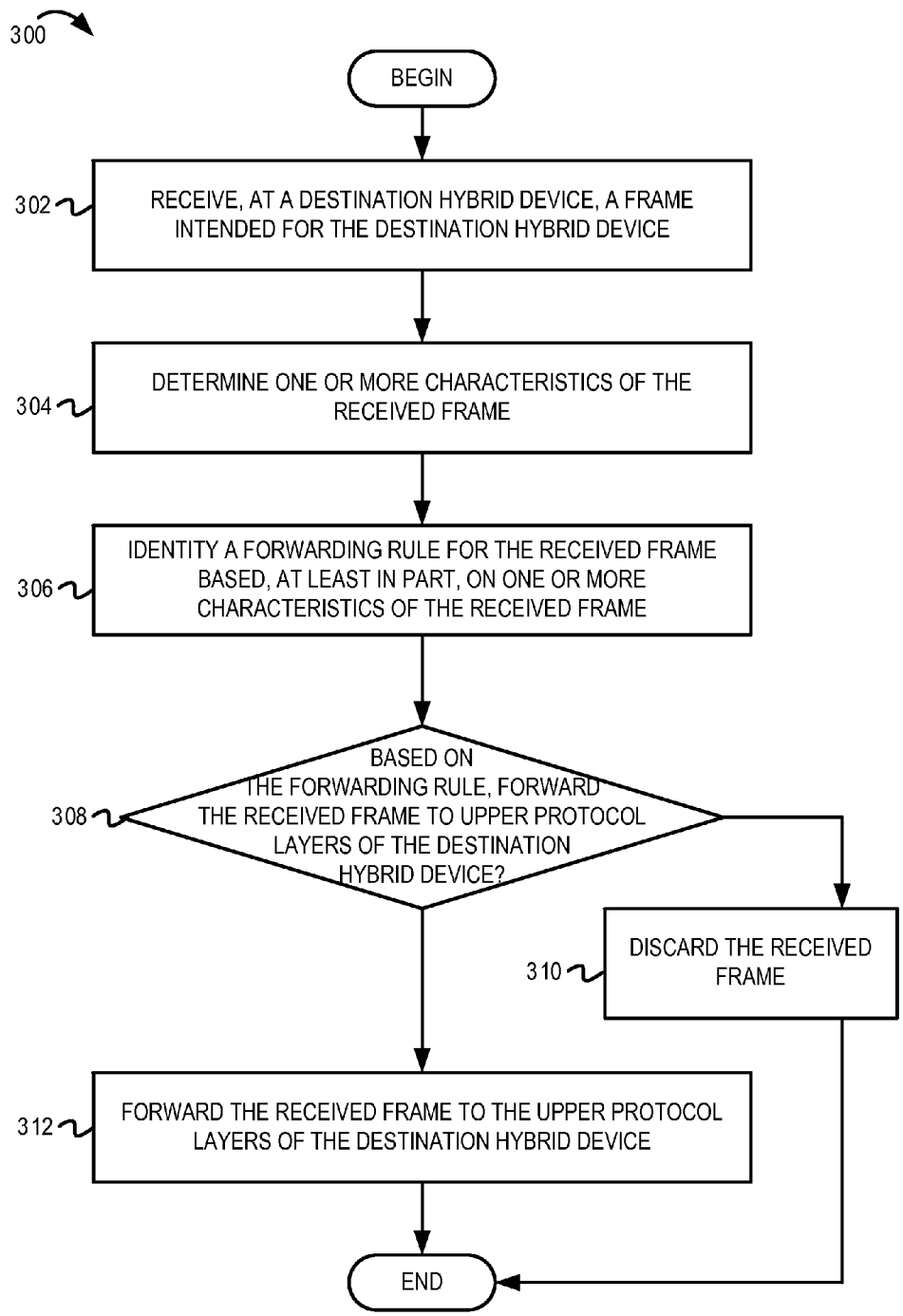
FIG. 3 is a flow diagram illustrating example operations of a destination hybrid device using forwarding tables for processing received frames.

FIG. 3 is a flow diagram 300 illustrating example operations of a destination hybrid device using forwarding tables for processing received frames. The flow 300 begins at block 302.

At block 302, a frame intended for a destination hybrid device is received at the destination hybrid device. With reference to the example of FIG. 1, the frame filter unit 112 of the destination hybrid device 110 can receive the frame intended for the destination hybrid device 110. In some embodiments, the frame filter unit 112 can be implemented within a hybrid adaptation layer of the destination hybrid device 110. Accordingly, the hybrid adaptation layer of the destination hybrid device 110 can receive the frame from the lower protocol layers (e.g., the MAC layer that corresponds to the network interface at which the received the frame). As will be further described below in FIG. 3, hybrid adaptation layer can apply frame forwarding rules (generated from frame forwarding tables associated with a source hybrid device, frame forwarding tables associated with the destination hybrid device, and/or frame forwarding tables associated with other network devices of the hybrid communication network) to determine whether the frame should be transmitted for further processing to upper protocol layers of the destination hybrid device 110. The flow continues at block 304.

At block 304, one or more characteristics of the received frame are determined. For example, the frame filter unit 112 of the destination hybrid device 110 can determine one or more characteristics of the received frame. The characteristics can include a destination network interface on which the frame was received, a source network interface from which the frame was transmitted, a source device identifier, a source link layer address, a destination link layer address, a type of frame (e.g., multicast, broadcast, unicast, etc.), and other suitable information from the received frame. The flow continues at block 306.

At block 306, a forwarding rule is identified for the received frame based, at least in part, on the one or more characteristics of the received frame. For example, the frame filter unit 112 can identify a forwarding rule to determine how to process the received frame intended for the destination hybrid device 110. In some embodiments, each of the forwarding rules can comprise a field that indicates the destination interface associated with the forwarding rule. This can enable the frame filter unit 112 to select and apply specific forwarding rules to frames that terminate at the destination hybrid device 110. The frame filter unit 112 can select different forwarding rules depending on the destination network interface at which the frame was received, the type of the frame, etc. The selected forwarding rule can help the frame filter unit 112 determine whether to forward the received frame to the upper protocol layer of the destination hybrid device 110 for further processing or whether to drop the frame. The flow continues at block 308.

At block 308, it is determined whether to forward the received frame to the upper protocol layers of the destination hybrid device based on the selected forwarding rule. The forwarding rules can be generated/selected to implement a specific distribution route or frame delivery tree and in order to avoid duplication of frames at the destination hybrid device 110. For example, the forwarding rule may indicate that unicast frames should be provided to the upper protocol layers only if they are received at a designated network interface of the destination hybrid device 110. The frame filter unit 112 can compare the destination network interface (determined at block 304) against the designated network interface. Accordingly, the frame filter unit 112 can determine whether to forward the received frame to the upper protocol layer of the destination hybrid device 110. As another example, the forwarding rule may indicate that multicast/broadcast frames should be provided to the upper protocol layers only if they were not previously received at another network interface of the destination hybrid device 110. In some embodiments, the forwarding rule can indicate an address (or identifier) of the hybrid adaptation layer if the received frame should be forwarded to the upper protocol layers. If it is determined that the received frame should not be forwarded to the upper protocol layer of the destination hybrid device, the flow continues at block 310. Otherwise, the flow continues at block 312.

At block 310, the received frame is discarded. The flow 300 moves from block 308 to block 310 if the frame filter unit 112 determines (based on the forwarding rule) that the received frame should not be forwarded to the upper protocol layers of the destination hybrid device 110. Discarding the received frame in accordance with the forwarding rule can help the frame filter unit 112 ensure that multiple copies of the same frame are not provided to the upper protocol layers, thus minimizing the possibility of upper layer processing errors. From block 310, the flow ends.

At block 312, the received frame is forwarded to the upper protocol layers of the destination hybrid device. The flow 300 moves from block 308 to block 312 if it is determined (based on the forwarding rule) that the received frame should be forwarded to the upper protocol layers of the destination hybrid device 110. In some embodiments, after the frame filter unit 112 provides the received frame to the upper protocol layers, the frame filter unit 112 can modify one or more forwarding rules in the forwarding rule database 114. For example, after forwarding a broadcast frame to the upper protocol layer, the frame filter unit 112 may update one or more forwarding rules to indicate that subsequently received copies of the frame should be discarded. In some embodiments, after the received frame is forwarded to the upper protocol layers, the frame filter unit 112 (or another suitable processing component) can "prune" one or more frame delivery trees of the hybrid adaptation layer by eliminating network interfaces (other than the destination network interface at which the frame was received). Pruning the frame delivery trees can help avoid forwarding duplicate frames to the upper protocol layers. The frame filter unit 112 can also modify one or more forwarding rules so that a frame is not forwarded to the upper protocol layers if the frame is received on a network interface that is not part of the frame delivery tree (associated with the frame). From block 312, the flow ends.

In some embodiments, some frames (e.g., topology frame, management frame, etc.) may not be subject to the operations of flow 300. In other words, if the destination hybrid device 110 receives a management frame, the destination hybrid device 110 may not apply the frame forwarding rules to determine whether the received management frame should be provided to the upper protocol layers or dropped. Instead, the received management frame can be automatically provided to the upper protocol layers for processing.

Figure 4:
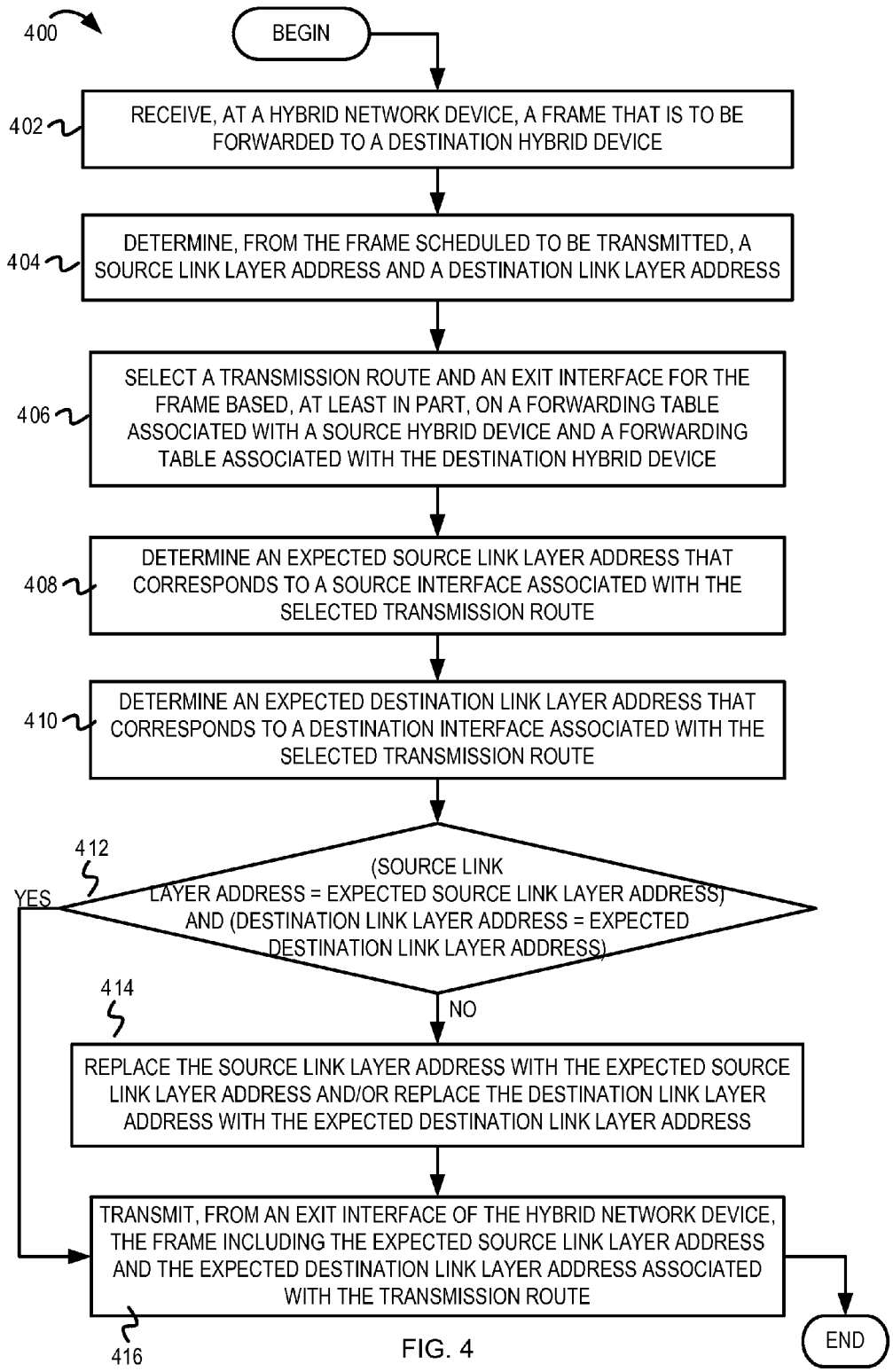
FIG. 4 is a flow diagram illustrating example operations of a hybrid communication device generating a frame for transmission.

FIG. 4 is a flow diagram 400 illustrating example operations of a hybrid communication device generating a frame for transmission. The flow 400 begins at block 402.

At block 402, a hybrid network device receives a frame that is to be forwarded to a destination hybrid device. With reference to the example of FIG. 1, the route selection unit 106 of the hybrid network device 102 can receive an indication that a frame is scheduled to be forwarded to the destination hybrid device 110. As discussed above with reference to FIG. 1, the route selection unit 106 may be implemented as part of a hybrid adaptation layer of the hybrid network device 102. Thus, the hybrid adaptation layer may receive the frame (to be forwarded) from a lower protocol layer of the hybrid network device 102. As will be further described below in FIG. 4, the route selection unit 106 can apply frame forwarding rules (generated from frame forwarding tables associated with the source hybrid device, frame forwarding tables associated with the destination hybrid device, and/or frame forwarding tables associated with other network devices of the hybrid communication network) to ensure that the frame includes an appropriate source link layer address and destination link layer address prior to forwarding the frame. The flow continues at block 404.

At block 404, a source link layer address and a destination link layer address are determined from the frame that is scheduled to be transmitted. For example, the route selection unit 106 can read one or more fields in the header of the frame and can determine the source link layer address and the destination link layer address. Typically, the hybrid network device that generated the frame can populate the source link layer address and the destination link layer address in the frame. The flow continues at block 406.

At block 406, a transmission route for the frame is selected based, at least in part, on a forwarding table associated with the source hybrid device and a forwarding table associated with the destination hybrid device. For example, the route selection unit 106 can access the forwarding rule database 104 and identify one or more forwarding rules that should be applied to the frame. In some embodiments, the forwarding tables (associated with the hybrid network device or received from other hybrid devices) can comprise forwarding rules that should be applied depending on the source device, the destination device, and other suitable factors. In other embodiments, the hybrid network device 102 can compile information received in multiple forwarding tables and can generate a set of forwarding rules that should be applied to each received frame. In some embodiments, each of the forwarding rules can comprise an identifier that associates the source device that transmitted the frame with the forwarding rule. This can enable the route selection unit 106 to select and apply specific forwarding rules to frames generated by a specific source hybrid device. In another embodiment, the forwarding rules can comprise an identifier that associates the destination device (for which the frame is intended) with the forwarding rule. This can enable the route selection unit 106 to select and apply specific forwarding rules to frames intended for a specific destination hybrid device. In addition to the transmission route, the route selection unit 106 can also identify a network interface "exit interface" of the hybrid network device via which the hybrid network device should forward the frame to the destination hybrid device. The flow continues at block 408.

At block 408, an expected source link layer address associated with the selected transmission route is determined. In some embodiments, a link layer address that corresponds to a source interface for the transmission route can be selected as the expected source link layer address. In another embodiment, a link layer address that corresponds to a predetermined network interface (not the source interface) of the source hybrid device can be selected as the expected source link layer address. In another embodiment, the route selection unit 106 can select a link layer address (or another suitable identifier) associated with the hybrid adaptation layer (of the source hybrid device) as the expected source link layer address. In another embodiment, the route selection unit 106 can determine, based on the forwarding tables associated with one or more hybrid devices of the hybrid communication network 100, that an intermediate legacy learning bridge has associated a particular link layer address with the source hybrid device 102. Accordingly, the route selection unit 106 can select the link layer address (learned by the intermediate legacy learning bridge) as the expected source link layer address to avoid conflicted learning or confusion at the legacy learning bridge. The flow continues at block 410.

At block 410, an expected destination link layer address associated with the selected transmission route is determined. In some embodiments, a link layer address that corresponds to a destination interface for the transmission route can be selected as the expected destination link layer address. In another embodiment, a link layer address that corresponds to a predetermined network interface (not the destination interface) of the destination hybrid device 110 can be selected as the expected destination link layer address. In another embodiment, the route selection unit 106 can select a link layer address (or another suitable identifier) associated with the hybrid adaptation layer of the destination hybrid device 110 as the expected destination link layer address. In another embodiment, the route selection unit 106 can determine, based on the forwarding tables associated with one or more hybrid devices of the hybrid communication network 100, that an intermediate legacy learning bridge has associated a particular link layer address with the destination hybrid device 110. Accordingly, the route selection unit 106 can select the link layer address (learned by the intermediate legacy learning bridge) as the expected destination link layer address to avoid conflicted learning or confusion at the legacy learning bridge. The flow continues at block 412.

At block 412, it is determined whether the source link layer address matches the expected source link layer address and whether the destination link layer address matches the expected destination link layer address. For example, the route selection unit 106 can compare the source link layer address against the expected source link layer address (determined based on the forwarding tables). The route selection unit 106 can compare the destination link layer address against the expected destination link layer address (determined based on the forwarding tables). If it is determined that the source link layer address does not match the expected source link layer address and/or that the destination link layer address does not match the expected destination link layer address, the flow continues at block 414. If it is determined that the source link layer address matches expected source link layer address and that the destination link layer address matches the expected destination link layer address, the flow continues at block 416.

At block 414, the source link layer address is replaced by the expected source link layer address and/or the destination link layer address is replaced by the expected destination link layer address. For example, the route selection unit 106 can overwrite the source link layer address field in the frame and/or the destination link layer address field in the frame to ensure consistency between information in the frame and information determined based on the forwarding tables. In doing so, the route selection unit 106 can ensure consistency when making local routing changes, and can avoid conflicted/unintended learning in legacy learning bridges. The flow continues at block 416.

At block 416, the frame including the expected source link layer address and the expected destination link layer address associated with the transmission route is transmitted from the exit interface and via the transmission route. From block 416, the flow ends.

It should be noted that some communication technologies may require that the value in the destination link layer address field of a unicast frame be equal to the link layer address of the destination network interface at which the frame is received to ensure that the destination network interface does not drop the frame. If the source hybrid device that generates the frame does not put the destination link layer address in the frame that is equal to the destination network interface, or if the destination network interface changes (e.g., because of a transmission route change), the operations described above in FIG. 4 can be employed (e.g., by a forwarding hybrid device) to overwrite the value in the destination link layer address field before forwarding the frame to the destination device.

In some embodiments, the operations of FIG. 4 can be employed to ensure correct delivery of frames via frame delivery routes that include one or more a legacy bridges. As discussed above, a legacy bridge might have previously learned that a network interface of a hybrid device (e.g., identified by its MAC address) can be accessed via one of the legacy bridge's interfaces (also referred to as "bridge port"). To ensure that a frame is forwarded through a legacy bridge via the desired bridge port, the destination link layer address in the frame may be updated to be consistent with the previously learned network interface. Likewise, the operations of FIG. 4 can also be employed to avoid conflicted or unintended source address learning in legacy bridges. For example, if the source link layer address field references a network interface of the source hybrid device that is different from the network interface learned by the legacy bridge, the legacy bridge may drop the frame. Therefore, the source link layer address in the frame may be updated to be consistent with the previously learned network interface of the source hybrid device.

Figure 5:
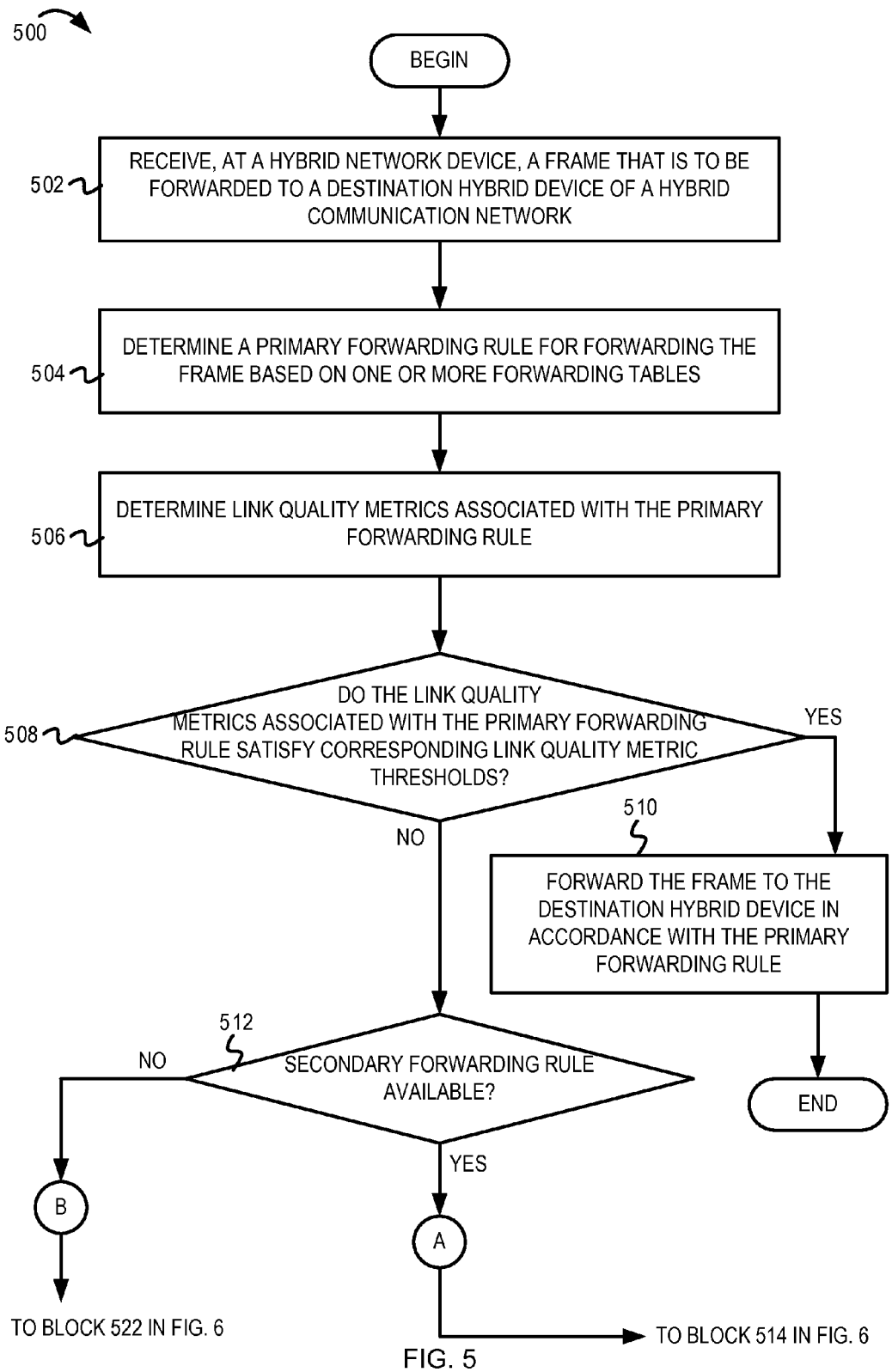
FIG. 5 is a flow diagram illustrating example operations of a hybrid network device for identifying a forwarding route.
Figure 6:
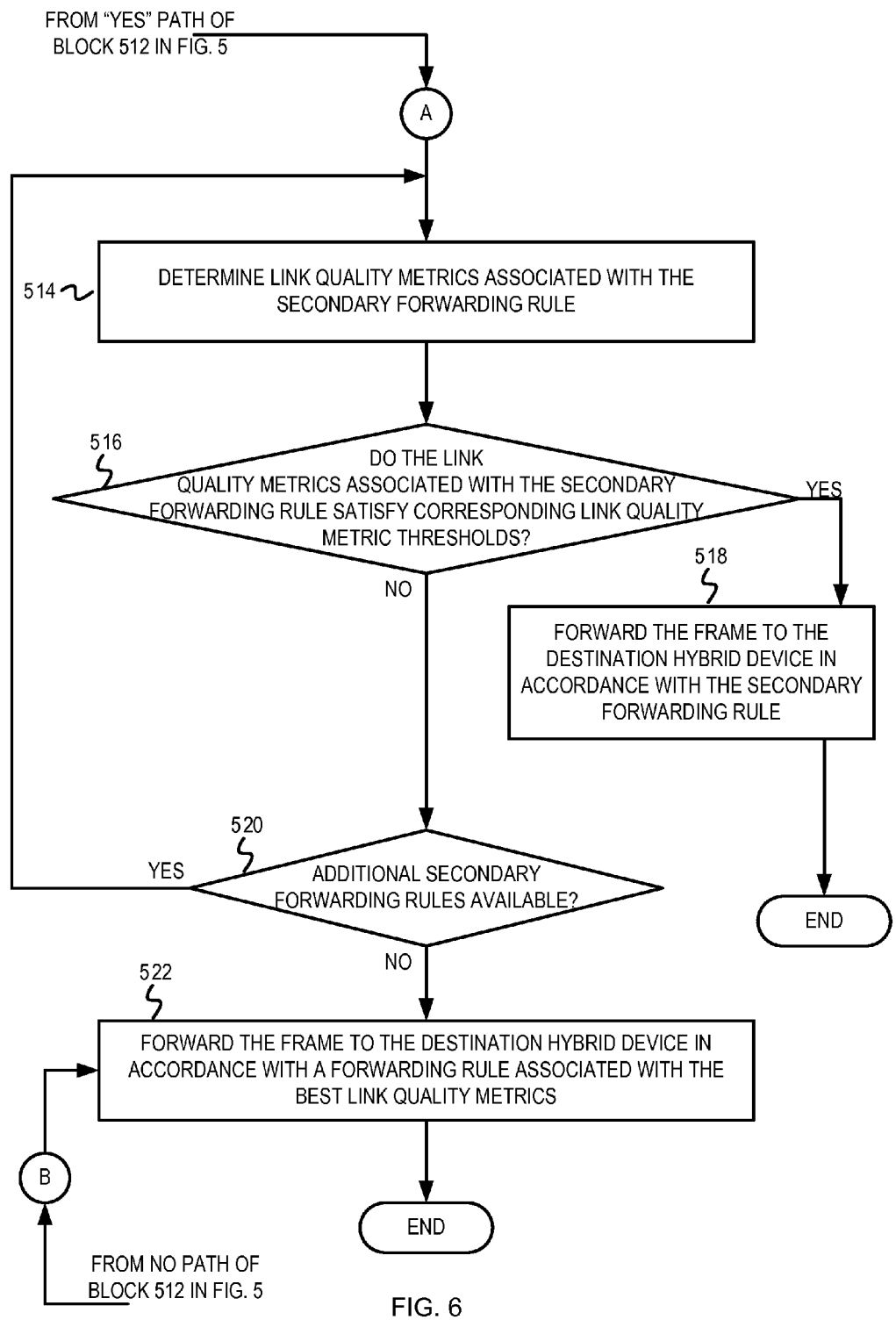
FIG. 6 is a block diagram of one embodiment of an electronic device including a mechanism for using forwarding tables for hybrid communication networks.

FIGS. 5 and 6 depict a flow diagram 500 illustrating example operations of a hybrid network device for identifying a forwarding route. The flow 500 begins at block 502 in FIG. 5.

At block 502, a hybrid network device receives a frame that is to be forwarded to a destination hybrid device of a hybrid communication network. For example, the hybrid network device 102 can receive the frame from a source hybrid device (that generated the frame), from another forwarding hybrid device, from a legacy bridge, or from an upper protocol layer of the hybrid network device 102. As will be further discussed below in FIG. 6, the hybrid network device 102 can select a transmission route via which the frame will be forwarded based on link performance values associated with the transmission routes. The flow continues at block 504.

At block 504, a primary forwarding rule for forwarding the frame is determined based on one or more forwarding tables. The forwarding tables can comprise one or more forwarding rules that indicate how the frame should be transmitted. For example, the forwarding rules can indicate an exit interface (of the hybrid network device) from which the frame should be transmitted and a transmission route via which the frame should be transmitted. In some embodiments, one of the forwarding rules may be designated as a primary forwarding rule. It should be noted that depending on the source hybrid device, the destination hybrid device, the source interface, the destination interface, and/or presence of legacy devices/bridges, a different forwarding rule may be designated as the primary forwarding rule. For example, the route selection unit 106 may select a first primary forwarding rule if the hybrid communication network 100 comprises legacy learning bridges and may select a second primary forwarding rule if the hybrid communication network 100 does not comprise legacy learning bridges. As will be further described below, the forwarding tables can indicate link performance values, a primary forwarding rule, and one or more secondary forwarding rules to be used for forwarding frames if the link performance values for the communication link(s) specified by the primary forwarding rule are not satisfied. The secondary forwarding rules may be ordered in terms of link performance values, device preferences, user input, etc. The flow continues at block 506.

At block 506, link performance values associated with the primary forwarding rule are determined. The link performance values associated with the primary forwarding rule can comprise communication medium utilization value, packet error rate (PER) value, link delivery latency value, etc. The communication medium utilization can indicate a percentage of the total time that the communication medium (e.g., a powerline communication medium) is being used for communication. The PER of a transmission route can indicate a percentage (or number) of the bits/symbols per packet that are incorrectly received at a destination device via the transmission route. The link delivery latency can indicate the elapsed time between the source device transmitting a frame via the transmission route and a destination device receiving the frame. The flow continues at block 508.

At block 508, it is determined whether the link performance values associated with the primary forwarding rule satisfy corresponding link performance thresholds. For example, the route selection unit 106 can determine whether the communication medium utilization exceeds a medium utilization threshold. The route selection unit 106 can also determine whether the PER associated with the transmission route indicated in the primary forwarding rule exceeds the PER threshold. The route selection unit 106 can also determine whether the link delivery latency associated with the transmission route indicated in the primary forwarding rule exceeds the link delivery latency threshold. If it is determined that the link performance values associated with the primary forwarding rule satisfies the link performance threshold, the flow continues at block 510. Otherwise, the flow continues at block 512.

At block 510, the frame is forwarded to the destination hybrid device in accordance with the primary forwarding rule. The primary forwarding rule can indicate an exit interface of the hybrid network device from which the frame should be forwarded, a destination network interface, and a communication link via which the frame should be transmitted. In some embodiments, the primary forwarding rule may also indicate link layer addresses that should be populated in the source link layer address field and the destination link layer address field of the frame. The route selection unit 106 may also execute operations described above with reference to FIG. 4 to ensure that the source link layer address field and the destination link layer address field have the appropriate values before forwarding the frame. From block 510, the flow ends.

At block 512, it is determined whether a secondary forwarding rule is available. The flow 500 moves from block 508 to block 512 if the route selection unit 106 determines that the link performance values associated with the primary forwarding rule do not satisfy their corresponding link performance thresholds. For example, the route selection unit 106 can determine whether a secondary forwarding rule is available if the communication medium utilization exceeds that medium utilization threshold, and/or the PER associated with the transmission route indicated in the primary forwarding rule exceeds the PER threshold, and/or that the link delivery latency associated with the transmission route indicated in the primary forwarding rule exceeds the link delivery latency threshold. In some embodiments, the route selection unit 106 can determine whether a secondary forwarding rule is available if the primary forwarding rule does not satisfy any of the link performance thresholds. In another embodiment, the route selection unit 106 can determine whether a secondary forwarding rule is available if the primary forwarding rule does not satisfy a majority (e.g., 2 out of 3) any of the link performance thresholds. If a secondary forwarding rule is available, the flow continues at block 514 in FIG. 6. Otherwise, the flow continues at block 522 in FIG. 6.

At block 514, link performance values associated with the secondary forwarding rule are determined. For example, the route selection unit 106 can determine the link performance values associated with the secondary forwarding rule. As described above, the link performance values associated with the secondary forwarding rule can comprise communication medium utilization, PER, link delivery latency, etc. The flow continues at block 516.

At block 516, it is determined whether the link performance values associated with the secondary forwarding rule satisfy corresponding link performance thresholds. As described above with reference to block 508, the route selection unit 106 can determine whether the link performance values associated with the secondary forwarding rule satisfy corresponding link performance thresholds. The link performance values associated with the secondary forwarding rule may be deemed to satisfy corresponding link performance thresholds if A) all the link performance values associated with the secondary forwarding rule satisfy the corresponding link performance thresholds or B) a predetermined number of the link performance values associated with the secondary forwarding rule satisfy their corresponding link performance thresholds. If it is determined that the link performance values associated with the secondary forwarding rule satisfy corresponding link performance thresholds, the flow continues at block 518. Otherwise, the flow continues at block 520.

At block 518, the frame is forwarded to the destination hybrid device in accordance with the secondary forwarding rule. The secondary forwarding rule can indicate an exit interface of the hybrid network device from which the frame should be forwarded, a destination network interface, and a communication link via which the frame should be transmitted. In some embodiments, the secondary forwarding rule may also indicate link layer addresses that should be populated in the source link layer address field and the destination link layer address field of the frame. In some embodiments, if the hybrid network device switched to a secondary transmission route (indicated in the secondary forwarding rule) because the primary transmission route (indicated in the primary forwarding rule) degraded, the hybrid network device can notify other hybrid devices about potential degradation along the primary transmission route to enable the other hybrid device to pre-emptively modify their transmission route (if needed). From block 518, the flow ends.

At block 520, it is determined whether another secondary forwarding rule is available for analysis. The flow 500 moves from block 516 to block 520 if the route selection unit 106 determines that the link performance values associated with the previously analyzed secondary forwarding rule(s) do not satisfy the corresponding link performance thresholds. If it is determined that another secondary forwarding rule is available for analysis, the route selection unit 106 identifies the next secondary forwarding rule and the flow loops back to block 514 where the route selection unit 106 determines the link performance values associated with the next secondary forwarding rule and compares them against the corresponding link performance thresholds. If it is determined that another secondary forwarding rule is not available for analysis, the flow continues at block 522.

At block 522, the frame is forwarded to the destination hybrid device in accordance with a forwarding rule that is associated with the best link performance values. The flow 500 moves from block 520 to block 522 if the route selection unit 106 determines that additional secondary forwarding rules are not available for analysis. The flow 500 also moves from block 512 to block 522 if the route selection unit 106 determines that there are no secondary forwarding rules available for analysis. In some embodiments, if the link performance thresholds are not satisfied for the primary forwarding rule and all the secondary forwarding rules, the route selection unit 106 can use a scoring system to select and apply the best forwarding rule. In this embodiment, for the transmission route identified by each forwarding rule and for each link performance value, a weighted average of the difference between the measured value of the link performance value and the corresponding link performance threshold is calculated and designated as the score for the forwarding rule. For example, for the primary forwarding rule, if the PER associated with the primary transmission route is 0.5, the PER threshold is 0.4, the medium utilization is 80%, and the medium utilization threshold is 50%, the score associated with the primary forwarding rule can be calculated as $A*(0.5-0.4)+B*(80\%-50\%)$, where A and B are predetermined weights. The weights can be determined based on user input, historical analysis and simulation, relative important of one link quality factor over another, etc. The lowest scoring forwarding rule can be used for forwarding the frame. From block 522, the flow ends.

It should be noted that although FIG. 5 depicts the forwarding rule associated with the smallest score being used to forward the frames if none of the forwarding rules satisfy the link performance thresholds, embodiments are not so limited. In some embodiments, if none of the forwarding rules satisfy the link performance thresholds, a previously designated default forwarding rule can be used for transmitting the frame. The default forwarding rule may or may not be the primary forwarding rule. In some embodiments, different default forwarding rules can be designated depending on the source hybrid device, the destination hybrid device, and other suitable factors.

In some embodiments, prior to using the scoring system to identify the forwarding rule and/or prior to applying the default forwarding rule, the route selection unit 106 can calculate a combined link performance value for each forwarding rule, if none of the forwarding rules satisfy the link performance thresholds. The route selection unit 106 can compare the combined link performance value for each forwarding rule against a combined link performance threshold. The forwarding rule that satisfies the combined link performance threshold can be selected. For example, the combined link performance value may be a weighted combination of the PER and medium utilization (combined PER-MU) associated with the forwarding rule. The combined PER-MU value can be calculated for each of the forwarding rules (primary and secondary forwarding rules). The forwarding rule that has a combined PER-MU value that is less than the combined PER-MU threshold can be selected. The frame can then be forwarded in accordance with the selected forwarding rule.

Although FIG. 5 depicts the secondary forwarding rules being consecutively analyzed after it is determined that the primary forwarding rule does not satisfy the link performance thresholds, embodiments are not so limited. In some embodiments, if it is determined that the primary forwarding rule does not satisfy the link performance thresholds, the scoring system (described above in block 522) can be applied to the secondary forwarding rules. The frame can be forwarded in accordance with the secondary forwarding rule that is associated with the lowest score.

It should be understood that FIGS. 1-6 are examples meant to aid in understanding embodiments and should not be used to limit embodiments or limit scope of the claims. Embodiments may perform additional operations, fewer operations, operations in a different order, operations in parallel, and some operations differently. In some embodiments, the hybrid network device can implement the operations of FIGS. 2-6 individually or in combination. For example, a source hybrid device may apply the forwarding rules to identify the transmission route, the appropriate source and destination interfaces, and the appropriate source and destination link layer addresses as described above in FIG. 2. Prior to transmitting the frame, the source hybrid device (e.g., the hybrid adaptation layer) can also analyze link performance values associated with a plurality of forwarding rules and select the forwarding rule (and corresponding transmission route) with the best link performance values, as described above in FIG. 4). Furthermore, prior to transmitting the frame, the source hybrid device (e.g., the hybrid adaptation layer) can ensure that the values in the source and destination link layer address fields are consistent with what legacy bridges have learned. As another example, a hybrid device may use the forwarding tables to discard appropriate received frames (intended for the hybrid device) but may not use the forwarding tables to control the transmission route of the frames it sources. As another example, a hybrid device may use the forwarding tables to control the transmission route of the frames it sources but may not use the forwarding tables to discard received frames intended for the hybrid device.

In some embodiments, the hybrid network device can use different forwarding rules based on the relative receive order of frames belonging to a common class (e.g., common destination link layer address, a common source link layer address, etc.). For example, a first forwarding rule can be applied to a first and third received frames and a second forwarding rule can be applied to a second and fourth received frames. This can be useful for "load balancing." In some embodiments, the scoring system described above in block 522 can be used to control the distribution/selection of frame forwarding rules. In other words, using different forwarding rules for different frames can help control the percentage of frames that are transmitted from each of the network interfaces of the hybrid network device. Furthermore, the hybrid network device can use different forwarding rules to control the complete end-to-end routing for a given class of frames or a given stream of frames. For example, the hybrid network device can select a first forwarding rule for a first class of frames, select a second forwarding rule for a second class of frames, and so on.

In some embodiments, after a new forwarding rule is selected for forwarding subsequent frames, the hybrid network device may wait for a minimum time duration before selected another new forwarding rule. For example, suppose that the hybrid network device selects a first forwarding rule for forwarding frames to a destination hybrid device. The hybrid network device may wait for a minimum time duration (e.g., 120 seconds) before switching to a second forwarding rule for forwarding subsequent frames to the destination hybrid device. This can help avoid excessive transmission route changes that might confuse network devices that receive the frames delivered along different transmission routes. Furthermore, changes in the forwarding rules to transmit frames belonging to a common stream (or frames exchanged by a source—destination pair) can also be supplemented by frame delivery ordering procedures. In some embodiments, after the hybrid network device changes the forwarding rule, the hybrid network device can notify other hybrid network devices in the hybrid communication network of the forwarding rule change (e.g., via a management message). This can enable another hybrid network device to re-evaluate its forwarding rules and to adjust its forwarding rules and forwarding tables to account for changing channel conditions that resulted in the selection of the new forwarding rule at the hybrid network device.

In some embodiments, assigning the secondary forwarding rules for each primary forwarding rule can help in implementing rapid route changes in response to changing channel conditions. Hybrid devices typically alter their forwarding tables to reflect these route changes. However, these hybrid devices may be several "hops" away from a forwarding hybrid device. Congestion in the communication network or degraded channels may result in significant delay between the change in the network conditions and the forwarding hybrid device being notified of the change (and updating its forwarding tables). Analyzing the forwarding rules based on link performance values and selecting the forwarding rule (and consequently the transmission route) that has the best link performance values can enable the forwarding hybrid device to make local routing decisions based on a current link quality, resulting in faster reaction to changing channel conditions. Furthermore, the presence of the secondary forwarding rules can also help in load balancing. An appropriate secondary forwarding rule can enable devices to dynamically balance the load placed on communication links based on analyzing the link performance values (e.g., link congestion, medium utilization, delivery latency, and/or other suitable current network conditions).

Although FIGS. 1-6 depict the hybrid network device that generates/forwards/receives the frame analyzing forwarding tables and applying an appropriate forwarding rule, embodiments are not so limited. In other embodiments, a different network device (e.g., a central routing coordinator) may be designated (e.g., by a network administrator) to A) identify which forwarding rule (and corresponding transmission route) should be used to transmit the frames, B) use the forwarding tables to determine the source interface, the destination interface, the source link layer address, and/or the destination link layer address, and C) set up the transmission route. In this embodiment, the central routing coordinator may need to control the behavior and operations of the original transmitting device (e.g., the source hybrid device that generated the frame that is to be transmitted). In some embodiments, the central routing coordinator may use the forwarding tables to indicate (to the hybrid network devices) which network interfaces should be used for transmitting frames with specific characteristics (e.g., frames with QoS delivery requirements).

Although FIG. 2 depicts the source hybrid device (that generated the frame) determining the source interface, the destination interface, and the transmission route based on analyzing the forwarding tables associated with the source hybrid device and at least the destination hybrid device, embodiments are not so limited. In other embodiments, a central routing coordinator (or another device configured to control frame routing) can control entire transmission routes that will be used by all the hybrid network devices. This can enable the routing central coordinator to ensure that predetermined QoS or link performance values for a particular stream (or a communication link) are met, that network resources are optimally utilized, and that frames (e.g., that are associated with a stream QoS) are consistently delivered within a prescribed required delivery latency. In other embodiments, the destination hybrid device may select the source interface, the destination interface, and the transmission route via which the source hybrid device should transmit the frame (based at least on the forwarding tables associated with the source and destination devices). Moreover, in some embodiments, the central routing coordinator may also execute the operations of FIG. 4 to ensure that another forwarding hybrid device populates the destination link layer address field of a frame scheduled to be transmitted with the link layer address of the appropriate destination network interface.

Finally, it is noted that there can be various possible approaches for generating the content of the forwarding tables in order to control end-to-end routing of frames through the communication network. One example approach is a centralized process, as described above, where a central routing coordinator determines the transmission route and the appropriate source and destination interfaces for all the frames and all the network devices. In the centralized process, the central routing coordinator can determine and control the content of the forwarding tables (e.g., the forwarding rules) for all the hybrid devices in the communication network. Another example approach is a source controlled process, as described above, where each source hybrid device determines the transmission route, determines the appropriate interfaces, and controls the forwarding table and forwarding rules for other hybrid devices for frames (or classes of frames) that the hybrid device sources. Another example approach is a sink controlled process, as described above, where each destination hybrid device determines the transmission route, determines the appropriate interfaces, and controls the forwarding table and forwarding rules for other hybrid devices for frames (or classes of frames) that are intended for the destination hybrid device. In the centralized process, the source controlled process, and the sink controlled process, each of the hybrid devices can control the content of the forwarding tables used by other hybrid devices. In doing so, a hybrid device can control the transmission route used, the transmit interface, source and destination addresses, secondary transmission routes, and criteria for using the secondary transmission routes. Another example approach is a fully distributed process, where each hybrid device independently determines the transmission route for frames that it sources, sinks, or forwards. In the fully distributed process, each hybrid device controls the content of its own forwarding table and does not control the content of the forwarding tables associated with other hybrid devices. Typically, when the fully distributed process is implemented in a communication network, all the hybrid devices of the communication network are configured to execute the fully distributed process for consistent routing.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable configurable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 7:
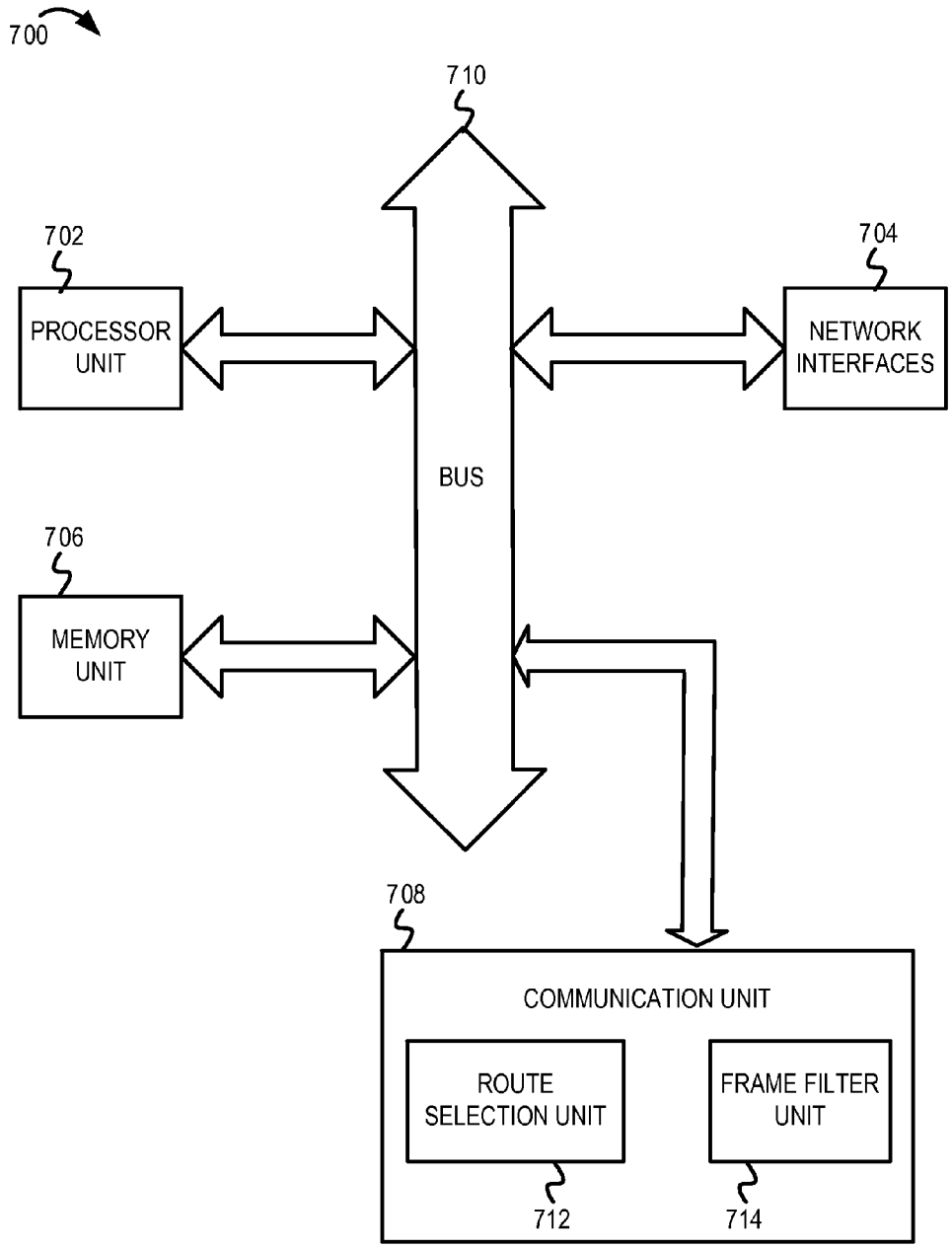
FIG. 7 is a block diagram of one embodiment of an electronic device including a mechanism for using forwarding tables for hybrid communication networks.

FIG. 7 is a block diagram of one embodiment of an electronic device 700 including a mechanism for using forwarding tables for hybrid communication networks. In some implementations, the electronic device 700 may be one of a desktop computer, laptop computer, a tablet computer, a mobile phone, a smart appliance, a powerline communication device, a gaming console, network bridging devices, or other electronic systems comprising a hybrid communication unit configured to communicate across multiple communication networks. The electronic device 700 includes a processor unit 702 (possibly including multiple processors, multiple cores, multiple nodes, and/or implementing multi-threading, etc.). The electronic device 700 includes a memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 700 also includes a bus 710 (e.g., PCI, ISA, PCI-Express, HyperTransport®, InfiniBand®, NuBus, AHB, AXI, etc.), and network interfaces 704 that include at least one of a wireless network interface (e.g., a WLAN interface, a Bluetooth® interface, a WiMAX interface, a ZigBee® interface, a Wireless USB interface, etc.) and a wired network interface (e.g., a PLC interface, an Ethernet interface, etc.). In some implementations, the electronic device 700 can comprise a plurality of network interfaces—each of which couples the electronic device 700 to a different communication network. For example, the electronic device 700 can comprise a PLC interface, an Ethernet interface, and a WLAN interface that couple the electronic device 700 with a powerline communication network, Ethernet, and a wireless local area network respectively.

The electronic device 700 also includes a communication unit 708. The communication unit 708 comprises a route selection unit 712 and a frame filter unit 714. In some embodiments, the route selection unit 712 and the frame filter unit 714 can be implemented as part of a hybrid adaptation layer.

The route selection unit 712 can implement functionality to use a forwarding table associated with the electronic device 700 and forwarding tables associated with other devices of the communication network, to identify a transmission route via which to a frame (generated by the electronic device 700) should be transmitted, a source interface, a destination interface, etc. as described above in FIG. 2. The route selection unit 712 can implement functionality to use forwarding tables associated with the electronic device 700 and the other devices of the communication network to maintain consistency between the values of the source and destination link layer addresses in a frame to be forwarded and the corresponding expected source and destination link layer addresses, as described above in FIG. 4. The route selection unit 712 can analyze link performance values associated with one or more forwarding rules and transmit a frame in accordance with a best performing forwarding rule, as described above in FIGS. 5-6. The frame filter unit 714 can use forwarding tables associated with the electronic device 700 and the other devices of the communication network to determine whether to provide a received frame to upper protocol layers for subsequent processing or whether to drop/discard the received frame, as described above in FIG. 3.

Any one of these functionalities may be partially (or entirely) implemented in hardware and/or on the processor unit 702. For example, the functionality may be implemented with an application specific integrated circuit, in logic implemented in the processor unit 702, in a co-processor on a peripheral device or card, etc. For example, in addition to the processor unit 702 coupled with the bus 710, the communication unit 708 may comprise at least one additional processor unit. Further, realizations may include fewer or additional components not illustrated in FIG. 7 (e.g., video cards, audio cards, additional network interfaces, peripheral devices, etc.). The processor unit 702, the memory unit 706, and the network interfaces 704 are coupled to the bus 710. Although illustrated as being coupled to the bus 710, the memory unit 706 may be coupled to the processor unit 702.

While the embodiments are described with reference to various implementations and exploitations, it will be understood that these embodiments are illustrative and that the scope of the inventive subject matter is not limited to them. In general, techniques for using forwarding tables in hybrid communication networks as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   receiving, at a first hybrid device of a communication network, a message intended for a second hybrid device, wherein the message comprises a source address and a destination address;
   determining, based on a transmission route for the message, whether the source address associated with the message matches a link layer address of a first of a plurality of network interfaces associated with the first hybrid device from which the message will be transmitted to the second hybrid device;
   overwriting the source address associated with the message with the link layer address of the first of the plurality of network interfaces associated with the first hybrid device in response to determining that the source address associated with the message does not match the link layer address of the first of the plurality of network interfaces associated with the first hybrid device from which the message will be transmitted to the second hybrid device;
   determining, based on the transmission route for the message, whether the destination address associated with the message matches a link layer address of a first of a plurality of network interfaces associated with the second hybrid device at which the message will be received at the second hybrid device;
   overwriting the destination address associated with the message with the link layer address of the first of the plurality of network interfaces associated with the second hybrid device in response to determining that the destination address associated with the message does not match the link layer address of the first of the plurality of network interfaces associated with the second hybrid device at which the message will be received at the second hybrid device; and
   transmitting, to the second hybrid device, the message comprising the link layer address associated with the first of the plurality of network interfaces associated with the first hybrid device and the link layer address associated with the first of the plurality of network interfaces associated with the second hybrid device.

2. The method of claim 1, further comprising:
   selecting the transmission route for the message based, at least in part, on a first forwarding table associated with a source hybrid device that generated the message and a second forwarding table associated with the second hybrid device for which the message is intended.

3. The method of claim 1, further comprising:
   determining, at the first hybrid device, one or more link performance values associated with a communication link between the first hybrid device and the second hybrid device;
   determining whether the one or more link performance values are in accordance with corresponding one or more link performance thresholds;
   in response to determining that the one or more link performance values are in accordance with the corresponding one or more link performance thresholds,
      transmitting, to the second hybrid device and via the transmission route, the message comprising the link layer address associated with the first of the plurality of network interfaces associated with the first hybrid device and the link layer address associated with the first of the plurality of network interfaces associated with the second hybrid device; and
   in response to determining that the one or more link performance values are not in accordance with the corresponding one or more link performance thresholds,
      identifying a new transmission route for transmitting the message to the second hybrid device based, at least in part, on accessing a first forwarding table associated with the first hybrid device.

4. The method of claim 3, wherein the one or more link performance values comprise one or more of a medium utilization value, a packet error rate value, and a link delivery latency value.

5. The method of claim 3, wherein said determining that the one or more link performance values are not in accordance with the corresponding one or more link performance thresholds comprises one of:
  determining that none of the one or more link performance values are in accordance with the corresponding one or more link performance thresholds; or
  determining that at least a predetermined number of the one or more link performance values are not in accordance with the corresponding one or more link performance thresholds.

6. The method of claim 5, further comprising:
  in response to determining that the one or more link performance values associated with all of the one or more secondary transmission routes are not in accordance with the corresponding one or more link performance thresholds,
    for each of the one or more secondary transmission routes,
      calculating a score associated with the secondary transmission route based, at least in part, on a weighted sum of a difference between one or more link quality values and corresponding one or more link quality thresholds; and
    selecting a first of the one or more secondary transmission routes associated with a smallest score as the new transmission route for transmitting the message to the second hybrid device.

7. The method of claim 5, further comprising:
  in response to determining that the one or more link performance values associated with all of the one or more secondary transmission routes are not in accordance with the corresponding one or more link performance thresholds,
    selecting a predetermined default transmission route as the new transmission route for transmitting the message to the second hybrid device.

8. The method of claim 3, wherein said identifying the new transmission route for transmitting the message to the second hybrid device based, at least in part, on accessing the first forwarding table associated with the first hybrid device comprises:
  determining that the new transmission route is associated with a second of the plurality of network interfaces associated with the first hybrid device and a second of the plurality of network interfaces associated with the second hybrid device;
  overwriting the source address associated with the message with a link layer address of the second of the plurality of network interfaces associated with the first hybrid device;
  overwriting the destination address associated with the message with a link layer address of the second of the plurality of network interfaces associated with the second hybrid device; and
  transmitting, to the second hybrid device and via the new transmission route, the message comprising the link layer address associated with the second of the plurality of network interfaces associated with the first hybrid device and the link layer address associated with the second of the plurality of network interfaces associated with the second hybrid device.

9. The method of claim 3, wherein, in response to determining that the one or more link performance values are not in accordance with the corresponding one or more link performance thresholds, said identifying the new transmission route for transmitting the message to the second hybrid device comprises:
  in response to determining that the one or more link performance values are not in accordance with corresponding one or more link performance threshold, identifying one or more secondary transmission routes for transmitting the message to the second hybrid device based, at least in part, on accessing the first forwarding table associated with the first hybrid device and a second forwarding table associated with the second hybrid device;
  for each of the one or more secondary transmission routes,
    determining one or more link performance values associated with the secondary transmission route;
    determining whether the one or more link performance values associated with the secondary transmission route are in accordance with the corresponding one or more link performance thresholds;
    in response to determining that the one or more link performance values associated with the secondary transmission route are in accordance with the corresponding one or more link performance thresholds,
      selecting the secondary transmission route as the new transmission route for transmitting the message to the second hybrid device; and
      transmitting the message to the second hybrid device via the new transmission route; and
    in response to determining that the one or more link performance values associated with the secondary transmission route are in accordance with the corresponding one or more link performance thresholds,
      analyzing a next of the one or more secondary transmission routes.

10. A hybrid device comprising:
  a plurality of network interfaces; and
  a route selection unit coupled with the plurality of network interfaces, the route selection unit operable to:
    receive a message intended for a second hybrid device of a communication network, wherein the message comprises a source address and a destination address;
    determine, based on a transmission route for the message, whether the source address associated with the message matches a link layer address of a first of the plurality of network interfaces associated with the hybrid device from which the message will be transmitted to the second hybrid device;
    overwrite the source address associated with the message with the link layer address of the first of the plurality of network interfaces associated with the hybrid device in response to the route selection unit determining that the source address associated with the message does not match the link layer address of the first of the plurality of network interfaces associated with the hybrid device from which the message will be transmitted to the second hybrid device;
    determine, based on the transmission route for the message, whether the destination address associated with the message matches a link layer address of a first of a plurality of network interfaces associated with the second hybrid device at which the message will be received at the second hybrid device;
    overwrite the destination address associated with the message with the link layer address of the first of the plurality of network interfaces associated with the second hybrid device in response to the route selection unit determining that the destination address associated with the message does not match the link layer address of the first of the plurality of network interfaces associated with the second hybrid device at which the message will be received at the second hybrid device; and transmit, to the second hybrid device, the message comprising the link layer address associated with the first of the plurality of network interfaces associated with the hybrid device and the link layer address associated with the first of the plurality of network interfaces associated with the second hybrid device.

11. The hybrid device of claim 10, wherein the route selection unit is further operable to:

select the transmission route for the message based, at least in part, on a first forwarding table associated with a source hybrid device that generated the message and a second forwarding table associated with the second hybrid device for which the message is intended.

12. The hybrid device of claim 10, wherein the route selection unit is further operable to:

determine one or more link performance values associated with a communication link between the hybrid device and the second hybrid device;

determine whether the one or more link performance values are in accordance with corresponding one or more link performance thresholds;

in response to the route selection unit determining that the one or more link performance values are in accordance with the corresponding one or more link performance thresholds, transmit, to the second hybrid device and via the transmission route, the message comprising the link layer address associated with the first of the plurality of network interfaces associated with the hybrid device and the link layer address associated with the first of the plurality of network interfaces associated with the second hybrid device; and in response to the route selection unit determining that the one or more link performance values are not in accordance with the corresponding one or more link performance thresholds, identify a new transmission route for transmitting the message to the second hybrid device based, at least in part, on accessing a first forwarding table associated with the hybrid device.

13. The hybrid device of claim 12, wherein the route selection unit operable to identify the new transmission route for transmitting the message to the second hybrid device based, at least in part, on accessing the first forwarding table associated with the hybrid device comprises the route selection unit operable to:

determine that the new transmission route is associated with a second of the plurality of network interfaces associated with the hybrid device and a second of the plurality of network interfaces associated with the second hybrid device;

overwrite the source address associated with the message with a link layer address of the second of the plurality of network interfaces associated with the hybrid device;

overwrite the destination address associated with the message with a link layer address of the second of the plurality of network interfaces associated with the second hybrid device; and transmit, to the second hybrid device and via the new transmission route, the message comprising the link layer address associated with the second of the plurality of network interfaces associated with the hybrid device and the link layer address associated with the second of the plurality of network interfaces associated with the second hybrid device.

14. The hybrid device of claim 12, wherein, in response to the route selection unit determining that the one or more link performance values are not in accordance with the corresponding one or more link performance thresholds, the route selection unit operable to identify the new transmission route for transmitting the message to the second hybrid device comprises the route selection unit operable to:

in response to the route selection unit determining that the one or more link performance values are not in accordance with the corresponding one or more link performance thresholds, identify one or more secondary transmission routes for transmitting the message to the second hybrid device based, at least in part, on accessing the first forwarding table associated with the hybrid device and a second forwarding table associated with the second hybrid device;

for each of the one or more secondary transmission routes,
determine one or more link performance values associated with the secondary transmission route;

determine whether the one or more link performance values associated with the secondary transmission route are in accordance with the corresponding one or more link performance thresholds;

in response to the route selection unit determining that the one or more link performance values associated with the secondary transmission route are in accordance with the corresponding one or more link performance thresholds, select the secondary transmission route as the new transmission route for transmitting the message to the second hybrid device; and transmit the message to the second hybrid device via the new transmission route; and in response to the route selection unit determining that the one or more link performance values associated with the secondary transmission route are in accordance with the corresponding one or more link performance thresholds, analyze a next of the one or more secondary transmission routes.

15. One or more non-transitory machine-readable storage media having instructions stored therein, which when executed by one or more processors causes the one or more processors to perform operations that comprise:

receiving, at a first hybrid device of a communication network, a message intended for a second hybrid device, wherein the message comprises a source address and a destination address;

determining, based on a transmission route for the message, whether the source address associated with the message matches a link layer address of a first of a plurality of network interfaces associated with the first hybrid device from which the message will be transmitted to the second hybrid device;

overwriting the source address associated with the message with the link layer address of the first of the plurality of network interfaces associated with the first hybrid device in response to determining that the source address associated with the message does not match the link layer address of the first of the plurality of network interfaces associated with the first hybrid device from which the message will be transmitted to the second hybrid device;

determining, based on the transmission route for the message, whether the destination address associated with the message matches a link layer address of a first of a plurality of network interfaces associated with the second hybrid device at which the message will be received at the second hybrid device;

overwriting the destination address associated with the message with the link layer address of the first of the plurality of network interfaces associated with the second hybrid device in response to determining that the destination address associated with the message does not match the link layer address of the first of the plurality of network interfaces associated with the second hybrid device at which the message will be received at the second hybrid device; and transmitting, to the second hybrid device, the message comprising the link layer address associated with the first of the plurality of network interfaces associated with the first hybrid device and the link layer address associated with the first of the plurality of network interfaces associated with the second hybrid device.

16. The non-transitory machine-readable storage media of claim 15, wherein the operations further comprise:

selecting the transmission route for the message based, at least in part, on a first forwarding table associated with a source hybrid device that generated the message and a second forwarding table associated with the second hybrid device for which the message is intended.

17. The non-transitory machine-readable storage media of claim 15, wherein the operations further comprise:

determining one or more link performance values associated with a communication link between the first hybrid device and the second hybrid device;

determining whether the one or more link performance values are in accordance with corresponding one or more link performance thresholds;

in response to determining that the one or more link performance values are in accordance with the corresponding one or more link performance thresholds, transmitting, to the second hybrid device and via the transmission route, the message comprising the link layer address associated with the first of the plurality of network interfaces associated with the first hybrid device and the link layer address associated with the first of the plurality of network interfaces associated with the second hybrid device; and in response to determining that the one or more link performance values are not in accordance with the corresponding one or more link performance thresholds, identifying a new transmission route for transmitting the message to the second hybrid device based, at least in part, on accessing a forwarding table associated with the first hybrid device.

* * * * *